US010036326B2

United States Patent
Veyrat-Masson et al.

(10) Patent No.: US 10,036,326 B2
(45) Date of Patent: Jul. 31, 2018

(54) METHOD FOR DETECTING A FAILURE IN A MOTIVE FLOW VALVE OF AN AIRCRAFT ENGINE FUEL CIRCUIT

(71) Applicant: SNECMA, Paris (FR)

(72) Inventors: Antoine Veyrat-Masson, Moissy-Cramayel (FR); Nicolas Gomes, Moissy-Cramayel (FR); Lauranne Mottet, Moissy-Cramayel (FR)

(73) Assignee: SNECMA, Paris (FR)

( * ) Notice: Subject to any disclaimer, the term of this patent is extended or adjusted under 35 U.S.C. 154(b) by 277 days.

(21) Appl. No.: 15/032,821

(22) PCT Filed: Oct. 27, 2014

(86) PCT No.: PCT/FR2014/052724
§ 371 (c)(1),
(2) Date: Apr. 28, 2016

(87) PCT Pub. No.: WO2015/063401
PCT Pub. Date: May 7, 2015

(65) Prior Publication Data
US 2016/0312706 A1    Oct. 27, 2016

(30) Foreign Application Priority Data

Oct. 30, 2013    (FR) ...................... 13 60634

(51) Int. Cl.
*F02C 7/22*        (2006.01)
*F02C 7/232*       (2006.01)
(Continued)

(52) U.S. Cl.
CPC .............. *F02C 7/232* (2013.01); *B64D 37/00* (2013.01); *B64D 37/005* (2013.01); *B64D 37/14* (2013.01); *B64D 37/32* (2013.01); *F05D 2260/80* (2013.01)

(58) Field of Classification Search
CPC ...... B64D 37/00; B64D 37/005; B64D 37/14; B64D 37/32; F02C 7/232; F02C 9/38;
(Continued)

(56) References Cited

U.S. PATENT DOCUMENTS 4,062,183 A * 12/1977 Davies .................... F02C 7/228
                                                      137/597
4,238,924 A * 12/1980 Kanegae .................. F02C 9/28
                                                      60/39.281
(Continued)

FOREIGN PATENT DOCUMENTS

GB         2 287 102 A      9/1995

OTHER PUBLICATIONS

Search Report dated Jul. 1, 2014 in French Patent Application No. 1360634 (with English translation of categories of cited documents).

(Continued)

*Primary Examiner* — Jesse Bogue
(74) *Attorney, Agent, or Firm* — Oblon, McClelland, Maier & Neustadt, L.L.P.

(57) ABSTRACT

A method detects a failure in a fuel return valve of an aircraft engine fuel circuit. A fuel system is connected to a fuel tank of the circuit and includes a high-pressure pump delivering a flow rate to an actuating cylinder, a cutoff valve capable of feeding the actuating cylinder disposed in a feed pipe of the engine; a fuel return pipe; a fuel return valve arranged to switch between an open position and a closed position. The method includes starting the engine at an engine speed; increasing the engine speed until a flow rate reaches a predefined value sufficient for opening the cutoff valve; measuring the position of the actuating cylinder and an engine speed corresponding to the opening of said cutoff valve.

9 Claims, 4 Drawing Sheets

(51) Int. Cl.
  *B64D 37/00*   (2006.01)
  *B64D 37/14*   (2006.01)
  *B64D 37/32*   (2006.01)

(58) Field of Classification Search
  CPC .. F05D 2260/80; F02D 41/22; F02D 41/3863; F02D 2041/224; F02D 41/221
  See application file for complete search history.

(56) References Cited

U.S. PATENT DOCUMENTS

| | | | | |
|---|---|---|---|---|
| 4,608,820 | A * | 9/1986 | White | F02C 9/46 251/129.11 |
| 5,493,902 | A | 2/1996 | Glidewell et al. | |
| 5,685,268 | A | 11/1997 | Wakemen | |
| 5,918,578 | A | 7/1999 | Oda | |
| 6,655,151 | B2 * | 12/2003 | Mahoney | F02C 9/263 60/39.281 |
| 2007/0175449 | A1 * | 8/2007 | Mahoney | F23K 5/147 123/454 |
| 2007/0199314 | A1 * | 8/2007 | Futa, Jr. | F15B 13/0438 60/399 |
| 2008/0296403 | A1 * | 12/2008 | Futa, Jr. | F02C 7/232 239/95 |
| 2016/0177838 | A1 * | 6/2016 | Gomes | F02C 7/232 137/565.29 |
| 2016/0238484 | A1 * | 8/2016 | Veyrat-Masson | B64D 37/00 |

OTHER PUBLICATIONS

International Search Report dated Jul. 29, 2015 in PCT/FR14/52724 Filed Oct. 27, 2014.

* cited by examiner

METHOD FOR DETECTING A FAILURE IN A MOTIVE FLOW VALVE OF AN AIRCRAFT ENGINE FUEL CIRCUIT

GENERAL TECHNICAL FIELD

The invention relates to the general field of aircraft engine fuel circuit architectures having motive flow tapping an engine fuel system.

PRIOR ART

FIG. 1 illustrates a conventional aircraft engine fuel architecture. In such an architecture, an electric pump 11, called the aircraft pump, immersed in a fuel tank 10, makes it possible to send fuel into an engine fuel system 20 of the aircraft through a supply pipe 1. The engine fuel system 20 makes it possible to produce hydraulic energy and to supply the engine (not shown) with fuel (arrow M) as well as rams making it possible to move variable geometries (not shown) (arrow GV).

This aircraft pump needs to be supplied with electricity.

To avoid having systematic recourse to this aircraft pump, a jet pump 12 operating using the venturi effect, is also immersed in the tank 10 and makes it possible to take over from the aircraft pump under certain conditions.

This jet pump 12 needs a hydraulic power source which is in known fashion supplied by a fuel return pipe 2 tapping the engine fuel system 20.

This return pipe 2 makes it possible to send into the jet pump 12 pressurized fuel taken from the engine fuel system 20.

To accomplish this, motive flow valve 30 can be positioned along the return pipe 2 so as to block it, under certain conditions depending on the design and the performance of the fuel system and in particular based on the engine speed N2 of the aircraft engine.

It often happens that the valve has a failure and remains blocked in the open position so that it allows fuel from the engine fuel system 20 to be sent into the fuel tank 10 when it should not do so. This causes deterioration in the performance of the engine because the stream of fuel withdrawn to be sent into the fuel tank causes a reduction in the flow rate (pressure) of the flow sent to the engine.

Consequently there exists a need to detect a failure in the motive flow valve.

PRESENTATION OF THE INVENTION

The invention responds to this need and proposes, according to a first aspect, a method for detecting a failure in a motive flow valve of an aircraft engine fuel circuit, said fuel circuit including:

a fuel tank;

an engine fuel system connected to the fuel tank, said fuel system including a high-pressure pump delivering a flow rate Q, depending on a speed of said engine, to an actuating ram capable of actuating variable geometries, a cutoff valve capable of supplying the actuating ram positioned in a supply pipe of said engine;

a fuel return pipe connected on the one hand downstream of the high-pressure pump and upstream of the cutoff valve and, on the other hand, to the fuel tank;

a motive flow valve arranged to switch between an open position and a closed position, said motive flow valve being capable of blocking, in the closed position, the fuel return pipe and to put, in the open position, the fuel return pipe into communication with the fuel tank;

the method including the following steps, implemented in a calculator:

starting the engine at a speed N0;

increasing the engine speed until the flow rate Q reaches a predetermined value Q0 sufficient for opening the cutoff valve;

measuring, on the one hand, the position of the actuating ram and on the other hand the engine speed N corresponding to the opening of said cutoff valve.

The invention is advantageously supplemented by the following features, taken alone or in any one of their technically possible combinations:

the method includes a step incorporating comparison of the engine speed N corresponding to the opening of the valve to a predetermined threshold;

if the engine speed N thus measured is greater than a predetermined threshold, the method includes a step involving detection of a failure of the motive flow valve;

if the engine speed N thus measured is greater than 8% of the predetermined threshold, the method includes a step involving detecting a failure of the motive flow valve;

the position of the ram is measured by an LVDT type sensor;

the predetermined flow rate value Q0 corresponds to a setting threshold of a cutoff valve spring;

According to a second aspect, the invention proposes a fuel circuit including:

a fuel tank;

an engine fuel system connected to the fuel tank, said fuel system including a high-pressure pump delivering a flow rate Q, depending on the speed of said engine, to an actuating ram capable of actuating variable geometries, a cutoff valve capable of feeding the actuation ram positioned in a supply pipe of said engine;

a fuel return channel connected on the one hand downstream of the high-pressure pump and upstream of the cutoff valve, and on the other hand to the fuel tank;

a motive flow valve arranged to switch between an open position and a closed position, said motive flow valve being capable of blocking, in the closed position, the fuel return pipe and, in the open position, to put into communication the fuel return pipe with the fuel tank;

a calculator configured to implement the following steps:

starting the engine at an engine speed N0;

increasing the engine speed until the flow rate Q reaches a predetermined value Q0 sufficient for opening the cutoff valve;

measuring, on the one hand, the position of the actuating ram, and on the other hand of the engine speed N corresponding to the opening of said cutoff valve.

Advantageously, the high-pressure pump is a positive displacement pump.

According to a third aspect, the invention proposes an aircraft including an engine supplied with fuel by a fuel circuit according to the second aspect of the invention.

PRESENTATION OF THE FIGURES

Other characteristics, aims and advantages of the invention will be revealed by the description that follows, which is purely illustrative and not limiting, and which must be read with reference to the appended drawings wherein, besides FIG. 1 which was already discussed:

Figure 4:
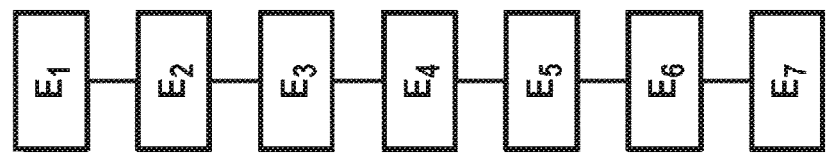

FIG. 4 schematically illustrates steps of a method according to the invention.

Figure 5:
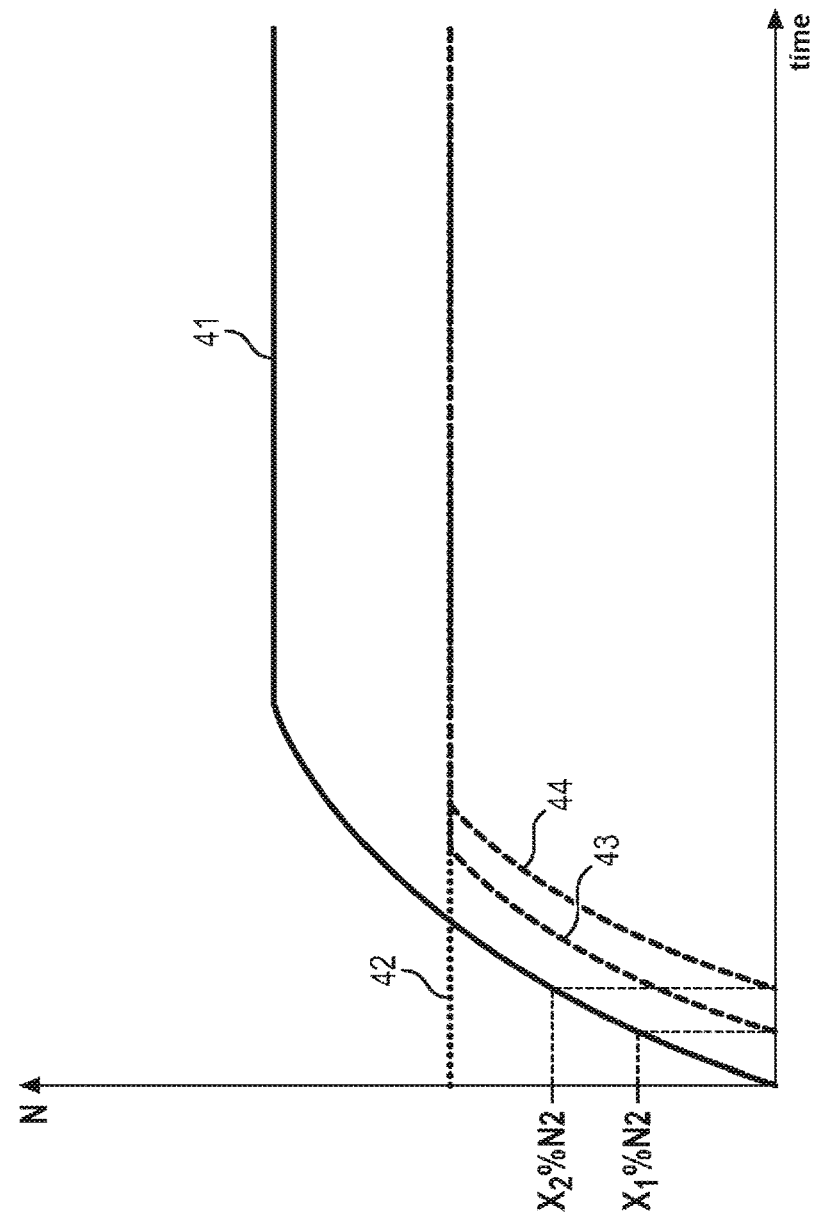

FIG. 5 illustrates a curve illustrating the progression of the position of a ram depending on an engine speed of a fuel circuit of the invention.

In all the figures, similar elements have identical reference symbols.

DETAILED DESCRIPTION OF THE INVENTION

Figure 1:
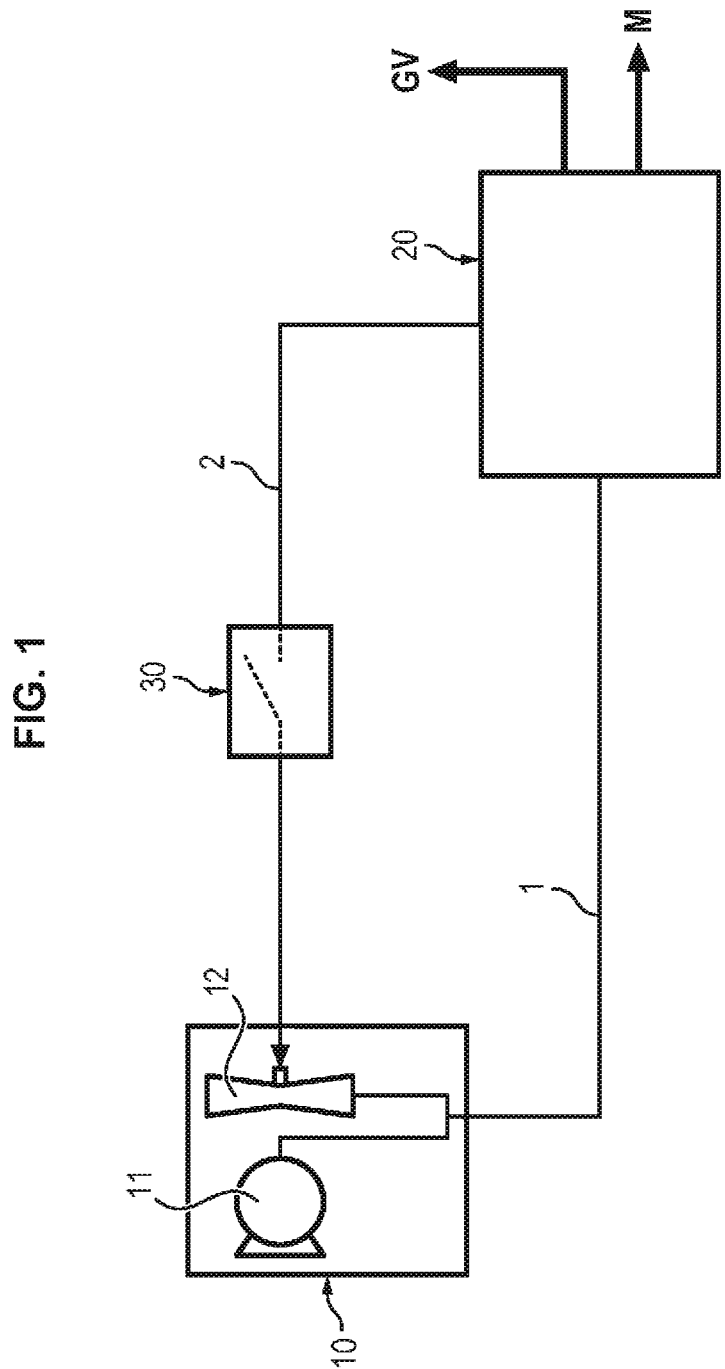
Figure 2:
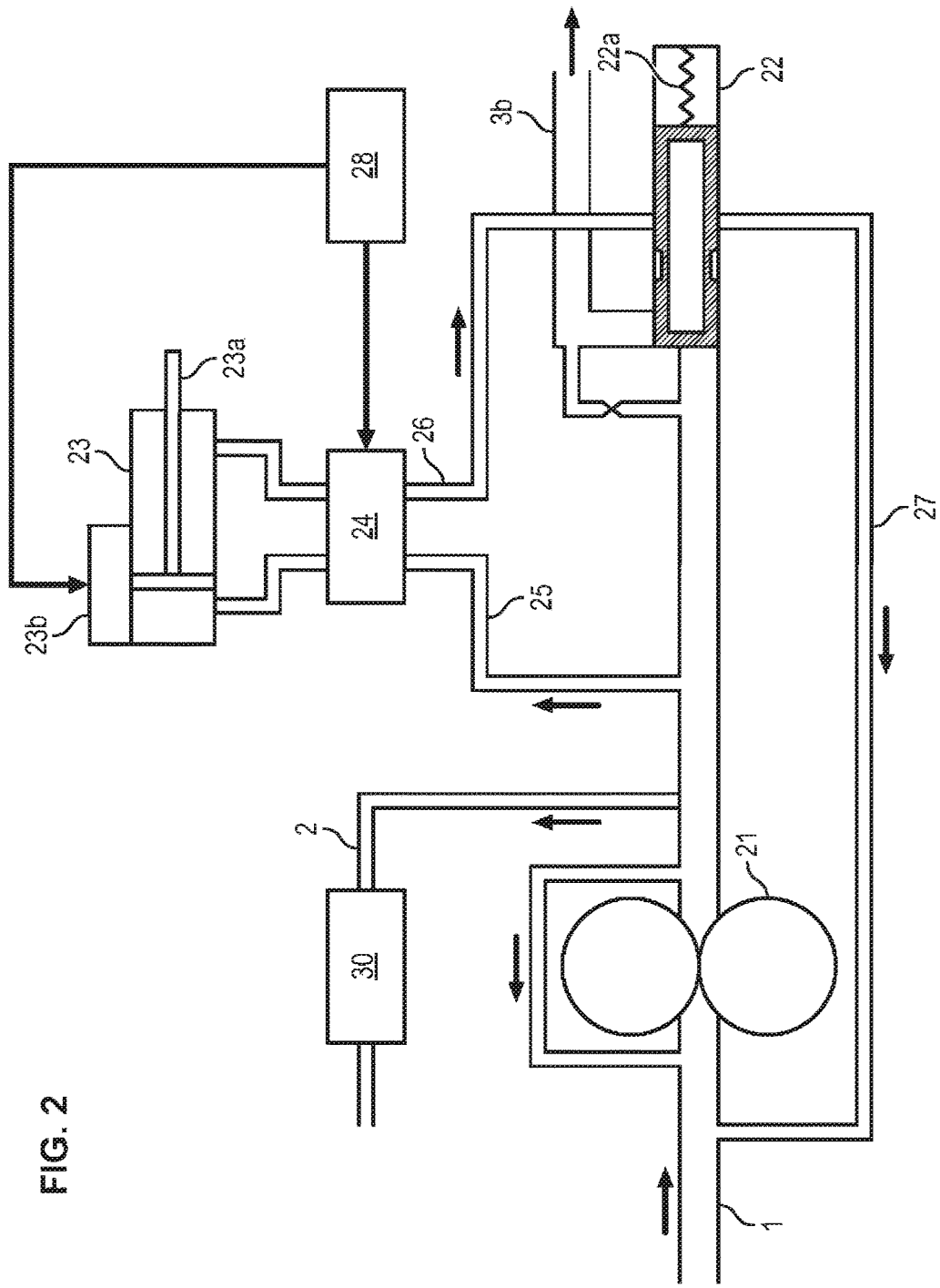
FIG. 2 illustrates a schematic of a portion of a fuel circuit of the invention with a cutoff valve in the closed position.
Figure 3:
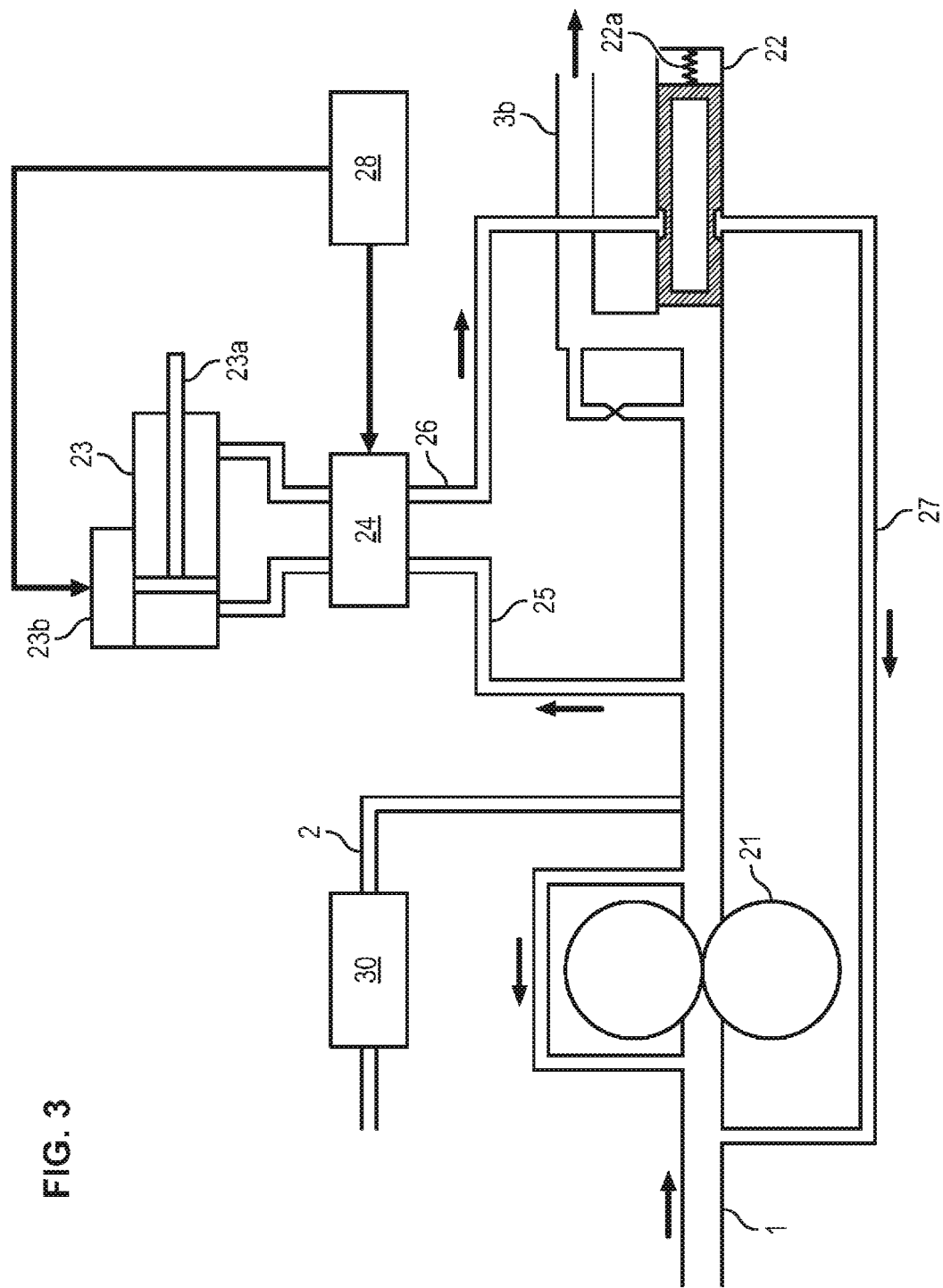
FIG. 3 illustrates a schematic of a portion of a fuel circuit of the invention with a cutoff valve in the open position.

With relation to FIGS. 2 and 3, the fuel system 20 includes a high-pressure pump 21 followed downstream by a cutoff valve 22 which makes it possible in particular to ensure a rise in pressure of the fuel system 20.

This cutoff valve 22 opens when the flow rate applied to it makes it possible to reach a precisely known setting threshold of its spring 22a. It allows, on the one hand, the activation of one or more ram(s) 23 providing for movement of variable geometries (not shown) through an associated servo-valve 24 connected by an upstream pipe 25 to the high-pressure pump and by a downstream pipe 26 to the cutoff valve 22, and on the other hand supply of the engines (not shown) by putting them into communication with the high-pressure pump 21.

The fuel system 20 further includes a calculator 28 connected to the different components of the fuel system 20 and provides for its general control based on various data, such as the desired engine speed N or the displacement of the piston 23a of the ram 23 measured by a linear variable displacement transducer (LVDT) sensor 23b.

In the embodiment described here, a single ram 23 is illustrated, but naturally in the case where there are several rams 23, each includes a sensor 23b for measuring the displacement of the piston.

In addition, a flow recirculating pipe 27 of the cutoff valve is connected to the downstream pipe 26 by means of the cutoff valve 22.

Of course, the fuel system 20 includes other known components (for example filters, valves, exchangers, . . . ) the description of which does not seem necessary for understanding the invention, and which are therefore not shown.

The feeding of the high-pressure pump 21 (preferably a positive displacement pump) being provided for by a low-pressure pump (not shown) located upstream, this high-pressure pump 21 delivers a flow rate Q depending on the engine speed N2 toward the ram 23 (through the servo-valve 24) and the cutoff valve 22.

When the cutoff valve 22 is in a closed state (FIG. 2), the pipe 26 between the output of the servo-valve 24 and the cutoff valve 22 is blocked by the latter. The pressure differential at the terminals of the ram 23 is zero and the two chambers of this ram being at identical pressure, the piston 23a is immobile, as are the variable geometries that it actuates.

As soon as the pressure level of the cutoff valve 22 exceeds a setting threshold of the spring 22a, that is when the flow rate that it sees is sufficiently high, it switches into a state of complete opening (FIG. 3) and the pipe 26 between the output of the servo-valve 24 and the cutoff valve 22 is no longer blocked. The fuel flow is then at low pressure and the piston 23a is subjected to a differential pressure (nonzero pressure differential) which puts it into motion if it is controlled by the calculator 28, The ram being equipped with an LVDT sensor 23b, it is then possible, by means of the calculator 28, to detect precisely the moment when the piston is moved, thus corresponding to the opening of the cutoff valve 22, and to read the associated engine speed N2.

According to the invention, to detect a failure in the motive flow valve, the applicant has noted that the engine speed for which the ram opens is linked to the state of the motive flow valve.

Indeed, the cutoff valve is displaced depending on the flow rate passing through it (hence the speed), and when it reaches a certain position, it opens an opening which makes it possible to free the movement of the ram. It is only at this moment that the variable geometries can move and follow their set point in position.

So as not to prevent this operation, it is necessary to keep the motive flow valve closed before movement of the cutoff valve. Indeed, tapping of the fuel flow by the motive flow valve, being located upstream of the cutoff valve, the tapped flow is one less flow passing through it and thus influences the speed which actuates it if ever it was open at the time when the variable geometries are moving.

If it therefore the detection of an offset in the opening operation of the ram which makes it possible to detect a failure in the motive flow valve.

The detection of a failure in the motive flow valve is implemented in the calculator according to a method described below in relation to FIG. 4.

The engine is started (step E1) at a low initial speed N0 and the cutoff valve 22 is closed.

First of all, the calculator 28 proceeds with the activation command (step E2) of the ram 23. However, the cutoff valve being closed, the ram cannot respond to this command and therefore remains immobile. In parallel with this command, the engine speed N is progressively increased (step E3). As long as the flow rate sent to the cutoff valve 22 is not sufficient, the latter remains closed and the ram 23 does not move. When the flow rate is sufficient (predetermined value Q0 corresponding to the setting threshold of the spring 12A), the cutoff valve 22 opens and the ram 23 then goes into movement.

The engine speed N corresponding to the opening of the cutoff valve 22 and therefore to the movement of the ram is read thanks to the LVDT 23b of the ram 23 to which the calculator 28 is connected, and stored in the latter (step E4 and step E5).

If the speed for which the ram begins to move is greater than a predetermined threshold, then the motive flow valve has failed and a failure is detected (step E6 and step E7).

On the other hand, if the speed for which the ram begins to move is equal to the predetermined threshold, then the motive flow valve is operating correctly.

This threshold depends on several factors and particularly on the type of fuel used, the temperature of the fuel, manufacturing tolerances as well as the aging of the equipment.

FIG. 5 illustrates as a function of time:
the variation 41 of the engine speed during starting;
the position set point 42 which the ram 23 must reach;
the progression of the position 43 of the ram 23 during starting when the motive flow valve is operating correctly;
the progression of the position 44 of the ram 23 during starting when the motive flow valve has failed.

It is noted in relation with FIG. 5 that during starting of the engine, the ram 23 is controlled to reach a position set point at a certain speed (curve 41). The ram 23 is blocked in its rest position (at 0 in FIG. 4) as long as the cutoff valve is not open, usually at a speed of $X_1\%$ N2 for example.

If a movement of the ram 23 is detected from $X_1\%$ N2, then the motive flow valve has not failed (curve 43) and if a movement of the ram 23 is detected later at at least $X_2\%$ N2 ($X_2>X_1$) and preferably 8% later than an $X_1\%$ N2 then the motive flow valve has failed (curve 44). Typically, $X_1\%$ amounts to 22% and $X_2\%$ is at least 30%.

The invention claimed is:

1. A method for detecting a failure of a motive flow valve of an aircraft engine fuel circuit, said fuel circuit including:
   a fuel tank;
   an engine fuel system connected to the fuel tank, said fuel system including a high-pressure pump delivering a flow rate Q, depending on an engine speed of said engine, to an actuating ram capable of actuating variable geometries, a cutoff valve capable of supplying the actuating ram positioned in a supply pipe of said engine;
   a fuel return pipe connected downstream of the high-pressure pump and upstream of the cutoff valve and, to the fuel tank;
   a motive flow valve arranged to switch between an open position and a closed position, said motive flow valve being capable of blocking, in the closed position, the fuel return pipe and, in the open position, to put into communication the fuel return pipe with the fuel tank;
   the method comprising the following steps, implemented in a calculator:
   starting the engine at an engine speed N0;
   increasing the engine speed until the flow rate Q reaches a predetermined value Q0 sufficient for opening the cutoff valve;
   measuring the position of the actuating ram and of the engine speed N corresponding to the opening of said cutoff valve; and based on the engine speed determining failure of the motive flow valve.

2. The method according to claim 1, including a step of comparing the engine setting speed N corresponding to the opening of the valve to a predetermined threshold.

3. The method according to claim 2, wherein, if the engine speed N thus measured is greater than the predetermined threshold, the method includes a step of detecting a failure of the motive flow valve.

4. The method according to claim 2, wherein if the engine speed N thus measured is greater than 8% of the predetermined threshold, the method includes a step of detecting a failure of the motive flow valve.

5. The method according to claim 1, wherein the position of the ram is measured by an LVDT type sensor.

6. The method according to claim 1, wherein the predetermined flow rate value Q0 corresponds to a setting threshold of a spring of the cutoff valve.

7. A fuel circuit comprising:
   a fuel tank;
   an engine fuel system connected to the fuel tank, said fuel system including a high-pressure pump delivering a flow rate Q, depending on the engine speed of said engine, to an actuating ram capable of actuating variable geometries, a cutoff valve capable of supplying the actuating ram positioned in a supply pipe of said engine;
   a fuel return pipe connected downstream of the high-pressure pump and upstream of the cutoff valve and on the other hand to the fuel tank;
   a motive flow valve arranged to switch between an open position and a closed position, said motive flow valve being capable of blocking, in the closed position, the fuel return pipe and, in the open position, to put into communication the fuel return pipe with the fuel tank;
   a calculator configured to implement the following steps:
   starting the engine at an engine speed N0;
   increasing the engine speed until the flow rate Q reaches a predetermined value Q0 sufficient for opening the cutoff valve;
   measuring the position of the actuating ram and of the engine speed N corresponding to the opening of said cutoff valve; and based on the engine speed determining failure of the motive flow valve.

8. The fuel circuit according to claim 7, wherein the high-pressure pump is a positive displacement pump.

9. An aircraft including an engine supplied with fuel by a fuel circuit according to claim 7.

* * * * *

UNITED STATES PATENT AND TRADEMARK OFFICE
CERTIFICATE OF CORRECTION

PATENT NO. : 10,036,326 B2
APPLICATION NO. : 15/032821
DATED : July 31, 2018
INVENTOR(S) : Antoine Veyrat-Masson et al.

It is certified that error appears in the above-identified patent and that said Letters Patent is hereby corrected as shown below:

In the Specification

Column 1, Line 8, change "having motive flow" to --having a motive flow--;

Column 1, Line 34, change "this, motive" to --this, a motive--;

In the Claims

Column 5, Line 43, change "engine setting speed" to --engine speed--; and

Column 6, Lines 24-25, change "valve and on the other hand to the" to --valve and to the--.

Signed and Sealed this
Fourteenth Day of January, 2020

Andrei Iancu
*Director of the United States Patent and Trademark Office*